USO08611515B2

(12) United States Patent
Ward

(10) Patent No.: US 8,611,515 B2
(45) Date of Patent: Dec. 17, 2013

(54) METHODS, SYSTEMS, AND PRODUCTS FOR BILLING CALLS

(75) Inventor: Jonathan O. Ward, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 865 days.

(21) Appl. No.: 12/198,195

(22) Filed: Aug. 26, 2008

(65) Prior Publication Data

US 2008/0310614 A1 Dec. 18, 2008

Related U.S. Application Data

(63) Continuation of application No. 11/478,982, filed on Jun. 30, 2006, now Pat. No. 7,443,969, which is a continuation of application No. 10/669,923, filed on Sep. 24, 2003, now Pat. No. 7,072,454, which is a continuation of application No. 09/498,684, filed on Feb. 7, 2000, now Pat. No. 6,654,451.

(51) Int. Cl.
*H04M 15/00* (2006.01)

(52) U.S. Cl.
USPC ............ 379/114.24; 379/115.01; 379/121.01; 379/125; 379/220.01

(58) Field of Classification Search
USPC .................. 379/111, 114.01, 114.05, 114.24, 379/114.27, 114.28, 115.01, 115.02, 379/121.01, 121.02, 125, 127.01, 120, 379/127.05, 219, 220.01, 221.02
See application file for complete search history.

(56) References Cited

U.S. PATENT DOCUMENTS

| 4,191,860 | A | | 3/1980 | Weber |
|---|---|---|---|---|
| 4,757,267 | A | * | 7/1988 | Riskin ...................... 379/114.24 |
| 4,987,587 | A | | 1/1991 | Jolissaint |
| 5,095,505 | A | | 3/1992 | Finucane et al. |
| 5,136,636 | A | | 8/1992 | Wegrzynowicz |
| 5,185,785 | A | | 2/1993 | Funk et al. |
| 5,425,090 | A | | 6/1995 | Orriss |
| 5,430,782 | A | | 7/1995 | Brady et al. |
| 5,533,107 | A | | 7/1996 | Irwin et al. |
| 5,533,108 | A | | 7/1996 | Harris et al. |
| 5,550,910 | A | | 8/1996 | DeJager |
| 5,563,933 | A | * | 10/1996 | August et al. ............ 379/114.01 |
| 5,590,186 | A | | 12/1996 | Liao et al. |
| 5,590,912 | A | | 1/1997 | Stevens |
| 5,689,555 | A | * | 11/1997 | Sonnenberg ............. 379/221.13 |
| 5,740,237 | A | | 4/1998 | Malik et al. |
| 5,742,667 | A | | 4/1998 | Smith |
| 5,771,284 | A | | 6/1998 | Sonnenberg |
| 5,781,620 | A | | 7/1998 | Montgomery et al. |
| 5,796,813 | A | | 8/1998 | Sonnenberg |
| 5,799,072 | A | * | 8/1998 | Vulcan et al. ............ 379/114.02 |
| 5,802,513 | A | * | 9/1998 | Bowie, III ............................ 1/1 |
| 5,812,655 | A | * | 9/1998 | Pickeral et al. .......... 379/221.14 |
| 5,850,432 | A | | 12/1998 | Desai et al. |
| 5,862,203 | A | | 1/1999 | Wulkan et al. |
| RE36,111 | E | * | 2/1999 | Neville .................... 379/127.01 |
| 5,878,126 | A | | 3/1999 | Velamuri et al. |
| 5,878,127 | A | | 3/1999 | Fleischer, III |
| 5,887,056 | A | | 3/1999 | Sonnenberg |

(Continued)

*Primary Examiner* — Binh Tieu
(74) *Attorney, Agent, or Firm* — Scott P. Zimmerman, PLLC

(57) ABSTRACT

Methods, systems, and products are disclosed for routing a communication. An identifier of an origination point of the communication is received. A destination point associated with a destination of the communication is determined. The origination point and the destination point are analyzed to determine whether the communication may be entirely routed within a local service provider's geographic area.

20 Claims, 4 Drawing Sheets

(56) References Cited

U.S. PATENT DOCUMENTS

| | | | |
|---|---|---|---|
| 5,901,213 A | 5/1999 | Benhabib et al. | |
| 5,905,791 A | 5/1999 | Goel et al. | |
| 5,943,411 A | 8/1999 | Houck et al. | |
| 5,956,396 A | 9/1999 | Ash et al. | |
| 5,974,133 A * | 10/1999 | Fleischer et al. | 379/230 |
| 5,987,114 A | 11/1999 | Sonnenberg | |
| 5,991,388 A * | 11/1999 | Sonnenberg | 379/220.01 |
| 6,137,870 A * | 10/2000 | Scherer | 379/127.06 |
| 6,163,597 A | 12/2000 | Voit | |
| 6,188,751 B1 | 2/2001 | Scherer | |
| 6,205,214 B1 | 3/2001 | Culli et al. | |
| 6,327,354 B1 | 12/2001 | Pelletier et al. | |
| 6,404,876 B1 * | 6/2002 | Smith et al. | 379/218.01 |
| 6,411,692 B1 | 6/2002 | Scherer | |
| 6,424,702 B1 | 7/2002 | Blumenschein et al. | |
| 6,445,784 B2 | 9/2002 | Uppaluru et al. | |
| 7,069,291 B2 * | 6/2006 | Graves et al. | 709/201 |
| 7,567,549 B2 * | 7/2009 | Adan et al. | 370/352 |
| 2003/0007621 A1 * | 1/2003 | Graves et al. | 379/219 |
| 2004/0022237 A1 | 2/2004 | Elliott et al. | |
| 2004/0022378 A1 | 2/2004 | Kugell et al. | |
| 2005/0152339 A1 * | 7/2005 | Scott et al. | 370/352 |
| 2013/0070757 A1 * | 3/2013 | Elliott et al. | 370/352 |

* cited by examiner

ITEMIZED CALLS

LOCAL INWARD DIRECT CALLS FOR 800-123-4567

| DATE | TIME | TO PLACE | TO NUMBER | FROM PLACE | FROM NUMBER | RC | MINUTES | TXC |
|---|---|---|---|---|---|---|---|---|
| 71. DEC 14 | 412P | LEWISBURG TN | 931-552-1234 | CLARKSVL TN | 931 552-1338 | # | 4.4 | .22 |
| 72. DEC 15 | 1201P | LEWISBURG TN | 931-552-1234 | OLD ZION TN | 931 761-2075 | # | 6.8 | .34 |
| 73. DEC 19 | 1138A | LEWISBURG TN | 931-552-1234 | CLARKSVL TN | 931 648-5530 | # | 1.2 | .06 |
| 74. DEC 19 | 303P | LEWISBURG TN | 931-552-1234 | CLARKSVL TN | 931 552-1037 | # | 3.3 | .17 |

OF CHARGES INCLUDED IN LOCAL TOLL-FREE PLAN SUMMARY

INTRALATA INWARD DIRECT DIAL CALLS FOR 800 123 4567

| DATE | TIME | TO PLACE | TO NUMBER | FROM PLACE | FROM NUMBER | RC | MINUTES | TXC |
|---|---|---|---|---|---|---|---|---|
| 75. DEC 08 | 504P | LEWISBURG TN | 931-552-1234 | CLARKSVL TN | 931 552-1338 | # | 7.2 | .50 |
| 76. DEC 10 | 1211P | LEWISBURG TN | 931-552-1234 | OLD ZION TN | 931 761-2075 | # | 5.3 | .37 |
| 77. DEC 18 | 1148A | LEWISBURG TN | 931-552-1234 | CLARKSVL TN | 931 648-5530 | # | 4.6 | .32 |
| 78. DEC 21 | 323p | LEWISBURG TN | 931-552-1234 | CLARKSVL TN | 931 552-1037 | # | 6.8 | .47 |

OF CHARGES INCLUDED IN LOCAL TOLL-FREE PLAN SUMMARY

FIG. 4

METHODS, SYSTEMS, AND PRODUCTS FOR BILLING CALLS

CROSS REFERENCE TO RELATED APPLICATIONS

This patent application is a continuation of U.S. patent application Ser. No. 11/478,982, filed Jun. 30, 2002, and now issued as U.S. Pat. No. 7,443,969, which is a continuation of U.S. patent application Ser. No. 10/669,923, filed Sep. 24, 2003, and now issued as U.S. Pat. No. 7,072,454, which is a continuation of U.S. patent application Ser. No. 09/498,684, filed Feb. 7, 2000, and now issued as U.S. Pat. No. 6,654,451, with all these applications incorporated herein by this reference in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to the field of communications, and more specifically, to systems and methods for billing and routing toll-free communications based on the local geographies of the originating communications address and of the terminating communications address.

Toll-free calls, also known as Inward Wide Area Telephone Service (INWATS) calls, allow a long distance subscriber to reverse the charges by permitting originating parties to call the subscriber without accruing long distance charges. In the United States, toll-free service is currently available for intrastate and interstate calls. Over the last twenty years, the volume of toll-free calls has increased to the extent that its traffic has become a substantial percentage of all toll calls. Toll-free service is especially useful for entities such as reservation call centers, retail call centers, hospitals, emergency hotlines, professional services, retail dealers, radio/TV promotions, government call centers, and education call centers.

An entity will often have a single advertised toll-free telephone number that is applicable to multiple locations and multiple services. Having a single advertised number helps to eliminate the expenses which would otherwise be associated with advertising the different locations and services with a different phone number for each. Additionally, advertising a single toll-free number can make it easier for a caller to remember the entity's phone number and easier to access multiple services with one phone call. For example, this is especially true for a nationally franchised pizza delivery business having a large number of business establishments all providing common goods and services. This allows a customer to remember one toll-free number that can be called from any location in the United States and routed to a local business establishment to order a pizza for local delivery.

In general, toll-free service connects an originating number through a series of switches connected to a long-distance carrier's communication network. The network queries a database to validate the toll-free number and to select a directory number (DN) for the terminating location of the toll-free number. The terminating number is then communicated to the long-distance carrier's switch and the call is routed via direct access or via local switches serving the terminating number.

There are numerous methods for routing toll-free calls. For example, U.S. Pat. No. 4,191,860 of Weber, discloses a routing method to access one of a number of reservation offices of a national airline using a common toll-free telephone number. According to Weber, a caller dials a toll-free number which together with the numbering plan area code (NPA, the first three digits of the caller's ten digit number) is used along with the toll-free number dialed by the caller to access a database to translate the toll-free number into a terminating number in the form of a Plain Old Telephone Services (POTS) number to which the call is routed. Since the translation compares the caller's NPA and the dialed toll-free number, callers from different NPAs may be routed to different reservation offices. Furthermore, the use of the translation permits out-of-hours traffic to be routed to a different set of reservation office than busy hour traffic.

Another routing example is U.S. Pat. No. 5,878,126 of Velamuri, et al., which discloses a method and system of routing an originating number to a particular subscriber location within a plurality of subscriber locations based on the geographic area from which the call originated. The method includes identifying the originating number with a specific location identifier indicating the location of the originating number, providing a range table of selected ranges of location identifiers and if the specific location identifier is within one of the selected ranges of the range table, the call is routed to the terminating number corresponding to the selected range containing the specific location identifier. If the specific location identifier is not located within one of the selected ranges, the call is routed to the terminating number corresponding to the specific location identifier located in an auxiliary database containing subscriber locations.

U.S. Pat. No. 4,757,267 of Riskin discloses a toll-free telephone system that routes an originating call to one of many nearby dealers (terminating numbers) based upon the coordinates of the originating number and upon the coordinates of the central office serving the dealer. A comparison is performed between the originating number and geographic locations of one to three selected nearby dealers. The system automatically dials the terminating number of the closest dealer thereby routing the originating number. If the terminating number is busy or does not answer, the system can attempt to call an alternate nearby dealer if one exists. The system further provides for billing each nearby dealer based on the number of incoming telephone calls and for reporting to each dealer the details of the incoming calls. This system can be uneconomical for local dealers and central offices.

U.S. Pat. No. 5,136,636 of Wegrzynowicz discloses a method for selecting a local dealer out of a large group of dealers for completion of a toll-free number. The caller is first connected to a toll switching system. That system sends a query to a first database using the toll-free number and the geographic information of the originating number. The first database responds with a routing number which is used to route a second query to one of a plurality of second databases. The second query uses the routing number and the geographical information of the originating number to access the second database and to obtain the terminating number of a local dealer. The terminating number is returned to the toll system for completing the call.

While each of these patents disclose methods for routing toll-free calls based on geographic information of the originating number and of the terminating number, none discloses a method for routing a local toll-free call via direct access by a local service provider. Today's toll-free subscribers are billed based on toll tariff rates and a variety of factors, such as, the number of subscriber lines, monthly hours of usage, time of day, and other factors. However, local toll-free calls are eligible for billing based on local tariff rates at substantially less cost to the subscriber. Despite this eligibility for discounted local toll-free billing, current industry practice is to bill toll-free subscribers either a fixed amount or a flat-rate per minute for each incoming call regardless of whether the toll-free call is considered local or toll. In addition, subscribers are not given the flexibility to allocate subscriber locations based on billing discounts. For example, a subscriber cannot assign geographic calling areas to a terminating number based on billing discounts.

Thus, there is a need in the art to provide toll-free methods and systems to bill and route local toll-free communications via local service providers. Similarly, there is a need in the art to provide subscribers with the flexibility to route incoming local toll-free communications based on discounted local toll-free billing, demographic information of originating numbers, call volumes, times of day, and other factors.

SUMMARY

According to exemplary embodiments, the needs described above and other needs are met by methods, systems, computer programs, and computer program products for routing local toll-free communications via one or more local service providers. As used herein, the term "local toll-free communication" is used as a term of art in to mean a toll-free communication wherein the originating communications address (e.g., telephone number, IP address, etc.) and the terminating, toll-free communications address are in the same Local Calling Area (LCA), are in the same Local Access and Transport Area (LATA), or otherwise in a local communications service area. The methods and systems allow local service providers to market new services to their customers. The methods and systems may be particularly advantageous to toll-free subscribers who are in large metropolitan areas or who desire to provide only a single toll-free communications address to their callers and receive a large number of communications from within their own LCA and intraLATA.

Current toll-free systems involve routing an originating communication through the local switches and Service Control Point (SCP) of a Local Service Provider (LSP) to a subscriber's interexchange carrier (IXC) who provides long distance transmission of the communication. A LSP is a provider of local access functionality to an originating party (i.e., the party placing the toll-free communication). The IXC pays the LSP for servicing the communication, in the form of an "originating access charge." Thereafter, the IXC can route the toll-free communication via their own dedicated access to the subscriber's terminating number or via an LSP switch that services the geographical area of the terminating number. If the IXC uses the LSP to route the originating communication to the terminating number, then the IXC pays the LSP a "terminating access charge."

The system routes the originating communication through the local switches to a regional SCP associated with a LSP. The SCP receives the dialed toll-free number and queries the 800 Service Management System (SMS) database to translate the dialed toll-free number to the terminating number. The SCP then examines the originating number and the terminating number to determine if the toll-free communication is within the same LATA or if the toll-free communication is outside of the LATA. If the toll-free communication is within the same LATA, the originating communication is routed via participating local switches to the terminating number. If the toll-free communication is outside of the LATA, the communication is routed to the IXC for further processing and routing.

When an originating party communications the subscriber paying for the toll-free service, the originating party dials the digits "800", "888", "877", "866", "855," or another toll-free three (3) digit prefix, in place of an Numbering Plan Area (NPA) code that is used with the DN. An NPA code is the initial group of three (3) digits of a North American Numbering Plan (NANP) number that divides the United States into geographical "area codes." The format of an NPA number is NXX, where N is any digit from 2 to 9 and X is any digit from 0 to 9. The format of a DN is NXX-XXXX. Since the three (3) digit toll-free prefix (i.e., 800, 888, 877, 866, 855, etc.) does not designate a particular geographical location for termination, the prefix represent a "virtual" telephone number referred to as a service access code (SAC). Hence, the ten digit toll-free number (e.g., "800-NXX-XXX") must be translated to the terminating number (e.g., "NPA-NXX-XXXX). Thereafter, the local SCP routes the originating communication based upon the wire center (using the NPA-NXX) or to a block group (using the entire NPA-NXX-XXXX) of the originating number and based upon the NPA-NXX of the terminating number. Routing may also be distributed among multiple participating LSPs that service the terminating communications address.

As mentioned above, a subscriber can chose wire center routing (using the NPA-NXX) or granular block group routing (using the entire NPA-NXX-XXXX). Block groups are defined for the entire United States by the Census Bureau and typically encompass a much smaller geographic area than a wire center. This gives a subscriber a greater degree of flexibility in defining which geographic areas should be routed to which subscriber locations. At the time of the initial subscription, the subscriber assigns the wire centers or block groups within its service area to the subscriber locations to which communications for these geographic areas should be routed to determine billing.

The system works in conjunction with a subscriber's existing toll-free service provider (IXC). FCC guidelines allow a toll-free subscriber to select a long distance carrier (IXC) for toll communications and one or more local carriers (LSPs) for local calls. Thus, a subscriber can have two or more different carriers serving its toll-free service.

To develop competitive offers to subscribers, a local communications network's SCP first compares the originating number with the terminating number to classify the communication as local or toll for routing and billing. A communication eligible for local delivery to a participating LSP may be billed to the subscriber according to local discount rates set forth in a local toll guide. On the other hand, a communication that is not eligible for local delivery (i.e., the communication is long distance or there is no participating local LSP) is routed via current industry practice and is generally billed to the subscriber according to its arrangement with the long distance toll-free service provider.

The local toll guide may work in conjunction with a subscriber's existing toll-free service provided by another carrier (IXC). According to the local toll guide, the subscriber may be provided two unique local toll-free rates—one rate for communications within the LATA outside of their Local Calling Area (LCA) and another rate for communications within their LCA. There may also be volume and term discounts. Volume may be determined using the aggregate total of all intraLATA toll-free minutes of use (MOUs) for all toll-free numbers. Term may be determined by the number of months (i.e., 6 months, 12 months, 18 months, etc.) committed to the participating LSP.

In some of the exemplary embodiments, the system may allow a subscriber to modify its own database(s) of terminating locations directly. The database contains information based on originating numbers, dialed toll-free numbers, locations of terminating numbers, communication volumes, time(s) of day, routing features, and other aspects. In accordance with prior practice, a subscriber is provided with a toll-free number which is used to access the subscriber's database(s) for modification. After the subscriber dials the database with its toll-free number, the subscriber is routed to an interface that allows the subscriber to log on. The subscriber specifies an NPA code or an NPA-NXX code for which the subscriber wishes to modify the terminating numbers in the database. The system queries the INWATS database to identify the particular database that contains translation information for that subscriber and that NPA code(s). The subscriber is then routed to that database and enters changes. After completion of changes for a particular NPA, the subscriber is returned to the main menu where the subscriber can enter another NPA or NPA-NXX code. While this feature may be provided for some subscribers, others may have their database modified by the LSP by submitting a work order to begin the process.

Some of the exemplary embodiments further provide a method of billing that incorporates geographic locations of the originating number and/or terminating number according to Number Portability (NP). That is, an NPA-NXX is considered to be ported when any subscriber previously served from an End Office (EO) associated with the NPA-NXX moves to another LSP and keeps the same 10-digit NPA-NXX-XXXX.

Other exemplary embodiments provide communication routing instructions based on different billing categories of geographic locations of the originating number and terminating number.

Further exemplary embodiments provide local toll-free billing and routing in conjunction with a toll-free communications address and enhanced features.

Still further exemplary embodiments of this invention minimize the number of queries to databases to obtain communication billing instructions.

Some of the exemplary embodiments minimize the number of queries to obtain communication routing instructions.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention. As is appreciated by those of ordinary skill in the art, this invention has wide utility in a number of areas as illustrated by the discussion below. These embodiments may be accomplished singularly, or in combination, in one or more of the implementations of the exemplary embodiments.

DESCRIPTION OF THE DRAWINGS

The above and other embodiments, objects, uses, advantages, and novel features of this invention are more clearly understood by reference to the following description taken in connection with the accompanying figures, wherein:

FIG. 4 illustrates a local toll-free billing statement with detailed communication information and billing rates according to some of the exemplary embodiments.

DESCRIPTION

Figure 1:
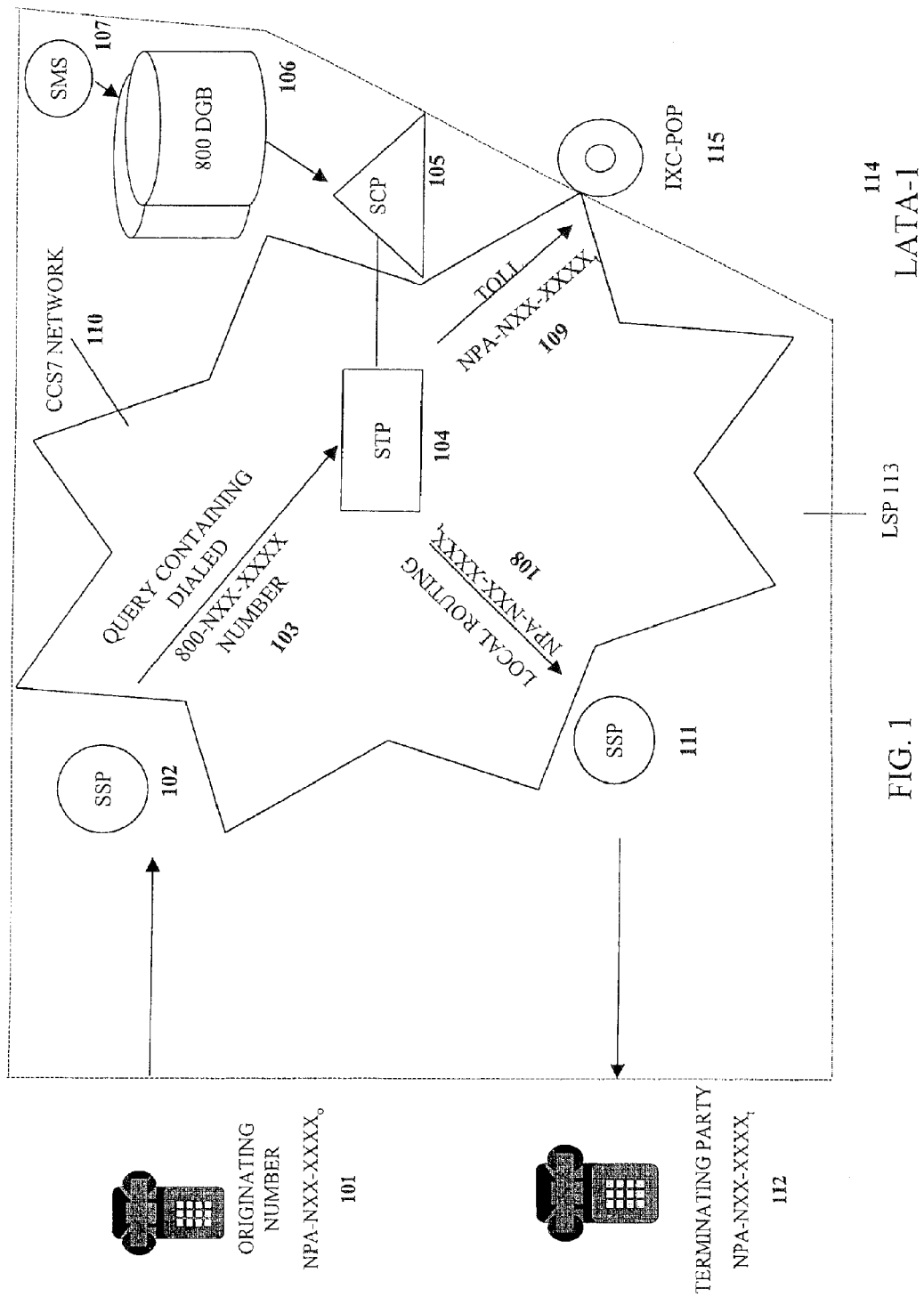
FIG. 1 illustrates an exemplary embodiment of the routing of a toll-free communication that has an originating number and a terminating number in the same LATA.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Exemplary embodiments of this invention provide systems, methods, and computer program products that operate with different communications devices, different users, and different communications networks to route and communicate local toll-free communications via one or more local service providers. As used herein, the term "local toll-free communication" is used as a term of art in to mean a toll-free communication wherein the originating communications address (e.g., telephone number, IP address, etc.) and the terminating, toll-free communications address are in the same Local Calling Area (LCA), are in the same Local Access and Transport Area (LATA), or otherwise in a local communications service area. As used herein, the term "communications device" includes wired and wireless communications devices, such as a POTS phone, a mobile phone, a wireless phone, a WAP phone, a satellite phone, a computer, a modem, a pager, a digital music device, a digital recording device, a personal digital assistant, an interactive television, a digital signal processor, and a Global Positioning System device.

FIG. 1 illustrates exemplary routing and communication of a toll-free telephone call. FIG. 1 shows an originating party (originating number) 101, who lives in Local Access and Transport Area-1 (LATA-1) 114. LATA is a term that refers to the local geographical areas within the United States wherein participating LSPs provide local transmission services via local switches, such as, Network Access Points (NAPs), Service Switching Points (SSPs) and Signaling Transfer Points (STPs). In a LATA that comprises a large metropolitan area, there are often numerous LSP providers.

Long distance transmission of calls is provided by IXCs. Therefore, IXC refers to the long distance carriers that route calls between the LATAs. Again, there are numerous IXC providers that a subscriber can use for toll-free services.

The IXCs interface with the LSPs at Points-of-Presence (POPs) within the LATAs. Therefore, a POP is the physical location within the LATA wherein the IXC provides access to its long distance network. The IXC network has an IXC POP 115 in LATA-1 114.

As shown in FIG. 1, the originating party 101 resides in LATA-1 114. Local telephone calls for LATA-1 are handled by LSP-1 113.

LSP-1 113 for LATA-1 114 includes the following as part of its communications network: switches SSP 102, STP 104, and SSP 109; SCP 105; and 800 Database (DB) 106.

A Service Management System (SMS) 107 is an Advanced Intelligent Network (AIN) operations system designed to manage software updates, service data updates, service subscriber data update, and provide subscriber service reports. The SMS 107 provides the data necessary to translate a "virtual" toll-free number (e.g., "800-NXX-XXX") to a terminating number (e.g., "NPA-NXX-XXXX").

When an originating party 101 places a toll-free call to a subscriber, the call traverses the path shown in FIG. 1. LSP-1 113 for LATA-1 114 routes the call to SSP switch 102. Then SSP switch 102 routes the call to the CCS7 Network 110. A query is issued to translate the dialed toll-free number 103 and is routed to STP switch 104. SCP 105 accesses the 800 database 106 provided by SMS 107 to translate the toll-free number 103 into a terminating number that has the form of NPA-NXX-XXXX$_t$. SCP 105 examines the originating number 101 (NPA-NXX-XXXX$_o$) with the terminating number 114 (NPA-NXX-XXXX$_t$) to classify the call as local or as toll. For example, that examination can begin with a simple comparison of the NPAs of the originating and terminating numbers. If the SCP determines that the NPAs are the same (e.g., both the originating and terminating number have the same area code), it may identify the call as a local call. In some areas and with the increasing spread of mobile phone numbers and Local Number Portability, however, that comparison alone may not suffice. Thus, the SCP may instead compare the originating and terminating numbers to a database that lists all NPA-NXX numbers that comprise particular LATAs.

Thereafter, STP 104 routes 108 the local toll-free call to SSP switch 111. SSP switch 111 routes the local toll-free call to the terminating party 114 for completion. If the toll-free call is categorized as toll, STP 104 routes 109 calls to IXC POP 115 for transmission to the IXC network for completion.

Figure 2:
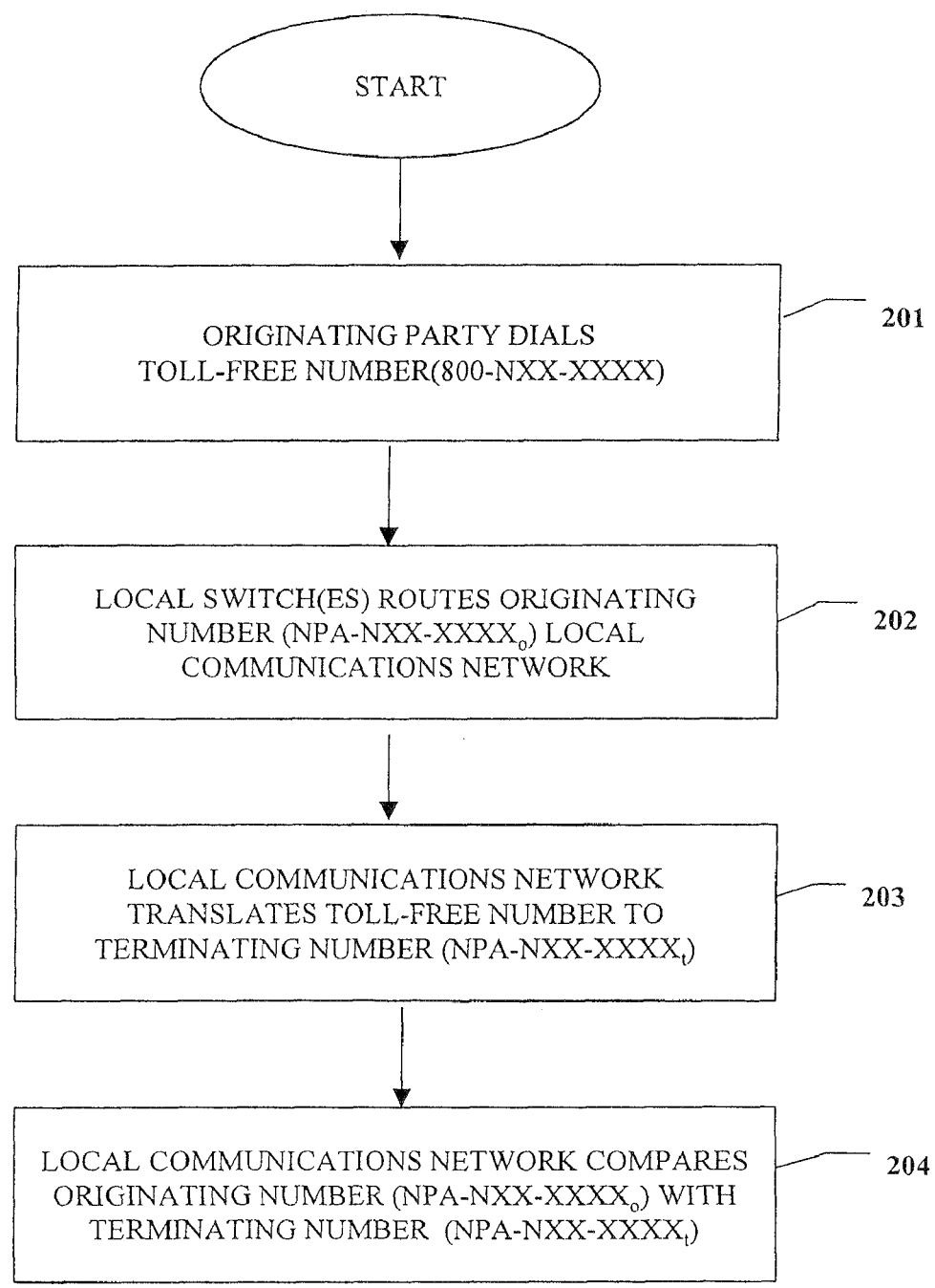
FIG. 2 is a flow diagram of the steps implemented in an embodiment of routing an originating number to the SCP database server according to some of the exemplary embodiments.

FIG. 2 is a flowchart illustrating exemplary routing and communication of the originating number (NPA-NXX-XXXX$_o$) to the local communications network. An originating party dials a toll-free number (e.g., "800-NXX-XXXX") 201. Local switches route the originating party to the local communications network 202. The local communications network translates the toll-free number to a terminating number (NPA-NXX-XXXX$_t$) 203. Next, the local communications network compares the origination number (NPA-NXX-XXXX$_o$) to the terminating number (NPA-NXX-XXXX$_t$) 204.

Figure 3:
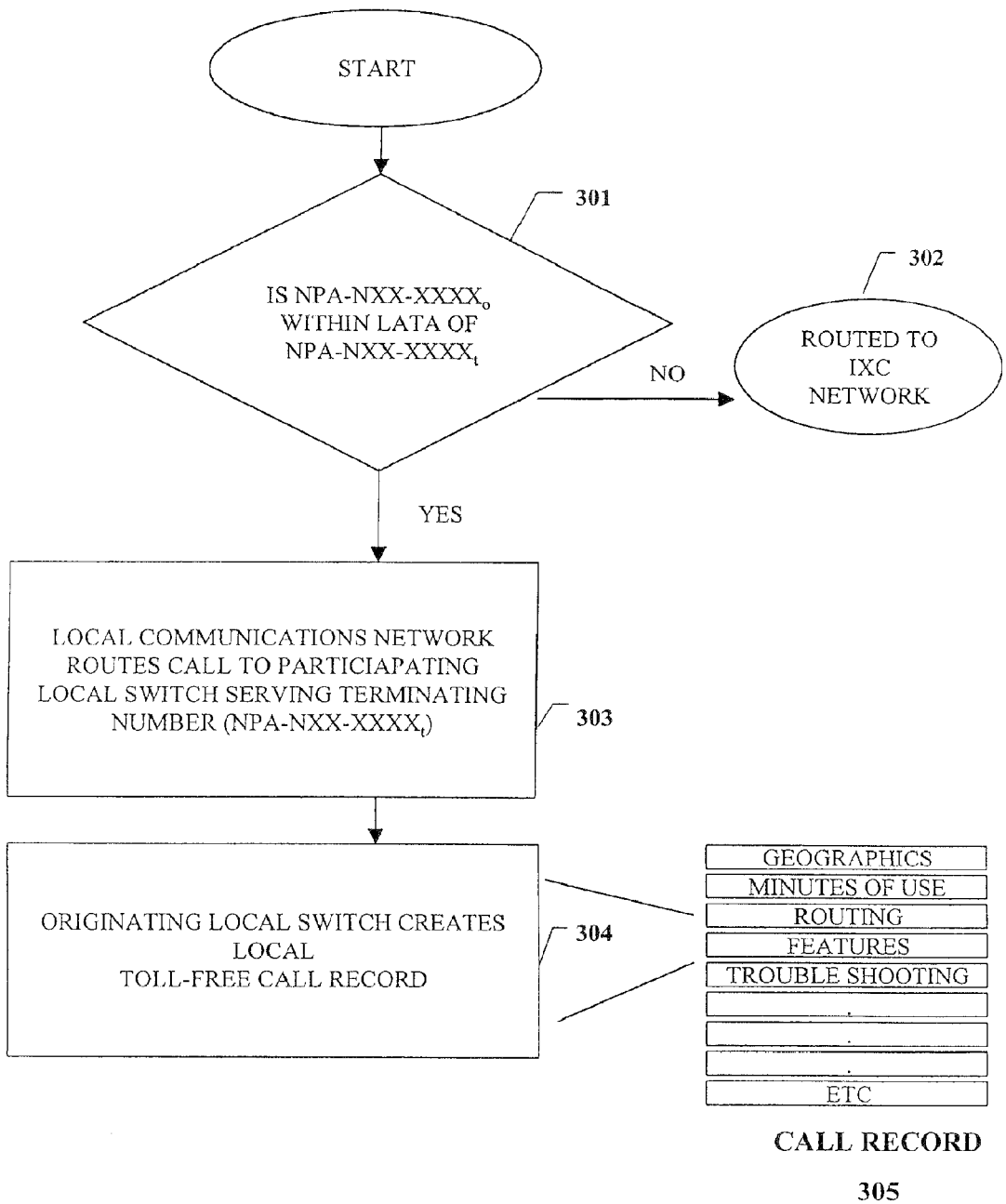
FIG. 3 is a flow diagram of the steps implemented in an exemplary embodiment of routing a terminating communications address to a participating local switch to complete the local toll-free communication.

FIG. 3 is a flowchart illustrating exemplary routing and communication of the terminating number from the local communications network. First the local network classifies the toll-free call as local or as toll based on a comparison of the origination number (NPA-NXX-XXXX$_o$) to the terminating number (NPA-NXX-XXXX$_t$) 301. If the origination number (NPA-NXX-XXXX$_o$) and the terminating number (NPA-NXX-XXXX$_t$) are outside the same LATA, the call is classified as toll and routed to the subscriber's IXC network 302. If the origination number (NPA-NXX-XXXX$_o$) and the terminating number (NPA-NXX-XXXX$_t$) are within the same LATA, the call is classified as local and routed from the local communications network to the participating local switch serving the terminating number 303. Finally, each originating local switch creates a local toll-free call record 304. The local toll-free call record contains information for the call, including but not limited to: geographic locations, minutes of use (MOUs), routing, call features and troubleshooting information 305. Multiple toll-free call records are thereafter combined into a billing block.

FIG. 4 illustrates a portion of a local toll-free billing statement according to some of the exemplary embodiments. The statement provides detailed call information for each originating call including originating number, geographic area, time of day, length of call, terminating number, eligibility for local toll-free discounting, and amount billed for each call.

Further details and exemplary embodiments are illustrated in the following table and examples. Table 1 provides an example of billing rates for this invention so that rating Examples 1, 2, and 3 can be explained.]

TABLE 1

LOCAL TOLL-FREE RATES

| Volume Commitment | Initial Period up to 30 secs | Local rate/min | Initial Period up to 30 secs | Toll Rate/ Min |
|---|---|---|---|---|
| VOLUME-0 | 0.0345 | 0.069 | 0.042 | 0.084 |
| VOLUME-A | 0.0325 | 0.065 | 0.0395 | 0.079 |
| VOLUME-B | 0.0305 | 0.061 | 0.037 | 0.074 |
| VOLUME-C | 0.0285 | 0.057 | 0.0345 | 0.069 |
| VOLUME-D | 0.0255 | 0.051 | 0.032 | 0.064 |
| VOLUME-E | 0.0245 | 0.049 | 0.0295 | 0.059 |
| VOLUME-F | 0.0235 | 0.047 | 0.02825 | 0.0565 |

EXAMPLE 1

A local toll-free call appears on the bill for 0.5 minutes. The subscriber is a VOLUME-0 subscriber with no commitment. The local toll-free call would be rated at 0.5×0.06900=0.03450. The call would be truncated to the penny so the call would be rated at 0.03 on the bill.

EXAMPLE 2

An IntraLATA call appears on the bill for a VOLUME-A subscriber that is 0.7 minutes. The call would be rated at 0.7×0.079=0.0553. The amount would be truncated and would rate on the bill at 0.05. Notice the call is not rounded, it is truncated, although rounding can be implemented By way of further example, term discounts are set at 5% for a 12 month commitment, 8% for a 24 month commitment and 11% for a 36 month commitment. Discounts associated with the Term plans may be applied on a per minute rate.

EXAMPLE 3

A local toll-free call appears on the bill for 4.8 minutes. The subscriber has a VOLUME-F commitment with a 24 month term. This term would give him an additional 8% discount. The applied rate for this subscriber would be the local toll-free rate for VOLUME-F times 1-0.08 discount. (4.8×(0.0235×1−0.08)). The easiest way to understand this is to determine the discount. 1−0.08 means the subscriber is paying 0.92 or 92% of the rate for someone without a discount, or: 0.92×0.0235=0.02162. To determine the charge to bill, multiply 0.02162×4.8=0.103776 or $0.10.

EXAMPLE 4

Using the system, providers of toll-free telecommunications services can substantially reduce the charges they bay to telecommunication service providers. By way of example, suppose Delta Airlines purchases an "800" number service from AT&T. Calls to the 800 number are terminated to Delta's Atlanta headquarters. Each time a Delta passenger passing through the airport in Atlanta calls Delta's 800 number for flight information, etc., Delta pays AT&T for that toll-free call—even though the call is a local one. Using this invention, calls directed to Delta's 800 number that are local in nature are, in fact, identified as a local call and routed via a local service provider that Delta chooses, such as BellSouth. Because the call is properly treated as a local one, the charge to Delta for the customer to make the 800 call is less than Delta would normally pay for such an 800 call.

In other embodiments, the system allows the subscriber to modify a database of originating numbers, dialed toll-free numbers, locations of terminating numbers and/or specific terminating number, call volumes, times of day, routing features, and other aspects for the subscriber's toll-free numbers. For example, the subscriber may logon to an information system to access and configure local toll-free billing for one or more of its toll-free numbers. The subscriber may specify an NPA code or an NPA-NXX code for which the subscriber wishes to modify the terminating numbers in the database. The system queries the INWATS database to identify the particular database that contains translation information for that subscriber and that NPA code(s). The subscriber is then routed to that database and enters changes. After completion of changes for a particular NPA, the subscriber is returned to the main menu where the subscriber can enter another NPA or NPA-NXX code. While this feature may be provided for some subscribers, others may have their database modified by the LSP by submitting a work order to begin the process.

While several exemplary implementations of some of the embodiments of this invention are described herein, various modifications and alternate embodiments will occur to those of ordinary skill in the art. For instance, the hardware described in FIG. 1 and mentioned in the Description are by way of example only, and this invention may always be enhanced to incorporate the most advanced available technology. By way of example, the network elements by which this invention may be deployed within a telecommunications network that may include an established network element (such as an SCP, STP, or SSP, an intelligent peripheral or a computer workstation with an appropriate processor, database and network links). As is understood by those of ordinary skill in the art, the local communications network, may also include a distributed computing network, such as the Internet (sometimes alternatively known as the "World Wide Web"), an intranet, a satellite network, a variety of telecommunications networks (e.g., Public Switched Telephone Network, Mobile Switching Telephone Office, and others), a local-area network (LAN), and/or a wide-area network (WAN). The local communications network may include coaxial cables, copper wires, fiber optic lines, and/or hybrid-coaxial lines. The local communications network may even include wireless portions utilizing any portion of the electromagnetic spectrum and any signaling standard (such as the I.E.E.E. 802 family of standards). The communications address of the originating party may be an electronic data communications address, such as an email address, webpage, and/or an Internet Protocol (IP) associated address, and/or may be a telecommunications address, such as a telephone number or a communications address utilizing any frequency in the electromagnetic spectrum (e.g., short wave radio receiver). Further, the billing statement in FIG. 4 is by way of example only and is meant to represent only a portion of a billing statement. Similarly, the rates in Table 1 and billing examples in Examples 1, 2, and 3 are illustrative only and the rates and billing calculations can be varied and changed at any time. Accordingly, this invention is intended to include other variations, modifications, and alternate embodiments that adhere to the spirit and scope of this invention.

The invention claimed is:

1. A method of routing a communication, comprising:
receiving originating information associated with an originating number of the communication;
receiving terminating information associated with a termination number of the communication;
comparing an originating geographical location of the originating information to a terminating geographical location of the terminating information;
determining the originating geographical information and the terminating geographical information share a common calling area in a particular local access and transport area served by a single local service provider;
determining the communication is a local toll-free communication in response to the common local calling area in the common local access and transport area;
routing the termination number to a switch serving the termination number; and
routing the local toll-free communication to the termination number.

2. The method of claim 1, further comprising discriminating the communication from other communications not originating and terminating within the common local calling area.

3. The method of claim 1, further comprising routing the local toll-free communication to a switch serving the destination number.

4. The method of claim 1, further comprising billing the originating number for the local toll-free communication.

5. The method of claim 1, further comprising billing for the local toll-free communication.

6. The method of claim 1, further comprising billing for the local toll-free communication at a rate derived from a volume of communications routed to the termination number.

7. The method of claim 1, further comprising billing for the local toll-free communication at a rate derived from a volume of communications routed from the originating number.

8. The method of claim 1, further comprising billing for the local toll-free communication at a rate derived from a subscription term associated with communications routed to the termination number.

9. The method of claim 1, further comprising billing for the local toll-free communication at a rate derived from a subscription term associated with communications routed from the originating number.

10. The method of claim 1, further comprising receiving an identifier of the originating number.

11. The method of claim 1, further comprising receiving an identifier of the termination number.

12. The method of claim 1, further comprising determining the communication is a toll call.

13. The method of claim 1, further comprising identifying the local toll-free communication as a local call.

14. The method of claim 1, further comprising transmitting a record of the local toll-free communication.

15. The method of claim 1, further comprising routing a call as the local toll-free communication.

16. The method of claim 1, further comprising creating a record of the local toll-free communication.

17. The method of claim 1, further comprising creating a billing statement for the local toll-free communication.

18. The method of claim 1, further comprising receiving a subscriber's modification of the termination number.

19. A system for routing a communication, comprising:
a processor; and
a database queried by the processor, the processor performing operations comprising:
receiving an originating number of the communication;
receiving originating information associated with the originating number;
receiving terminating information associated with a termination number of the communication;
comparing an originating geographical location of the originating information to a terminating geographical location of the terminating information;
determining the originating geographical information and the terminating geographical information share a common calling area in a common local access and transport area served by a local service provider;
determining the communication is a local toll-free communication in response to the common local calling area in the common local access and transport area;
routing the originating number to a switch serving the termination number; and
routing the local toll-free communication to the termination number.

20. Computer memory storing instructions that when executed cause a processor to perform operations, the operations comprising:
receiving an originating number of a communication;
receiving originating information associated with the originating number;
receiving terminating information associated with a termination number of the communication;
comparing an originating geographical location of the originating information to a terminating geographical location of the terminating information;
determining the originating geographical information and the terminating geographical information share a common calling area in a common local access and transport area served by a local service provider;
determining the communication is a local toll-free communication in response to the common local calling area in the common local access and transport area;
routing the originating number to a switch serving the termination number; and
routing the local toll-free communication to the termination number.

* * * * *